Nov. 25, 1969  D. U. NORGREN  3,480,366
METHOD AND APPARATUS FOR DETERMINING IMAGE
ASYMMETRY IN OPTICAL LENSES
Filed Sept. 16, 1966
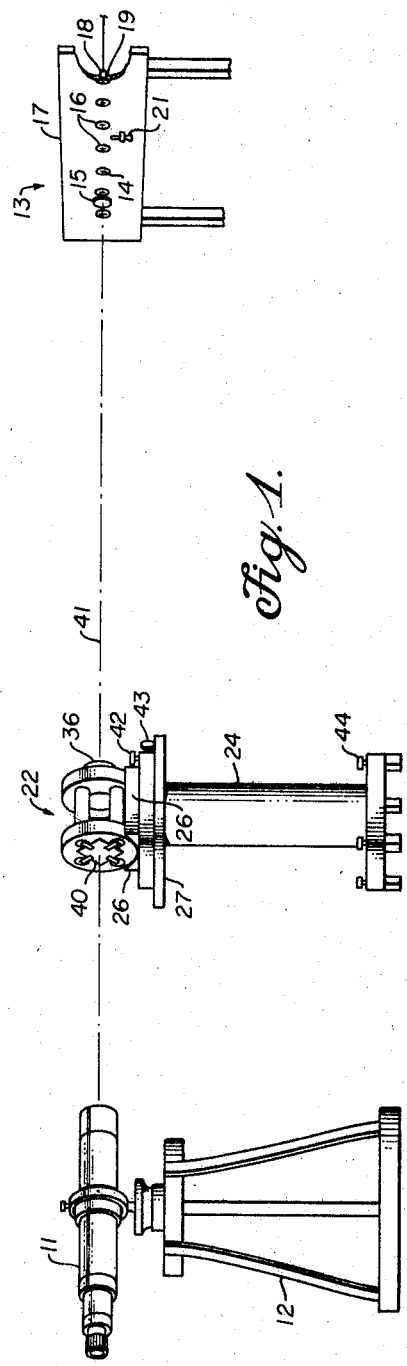
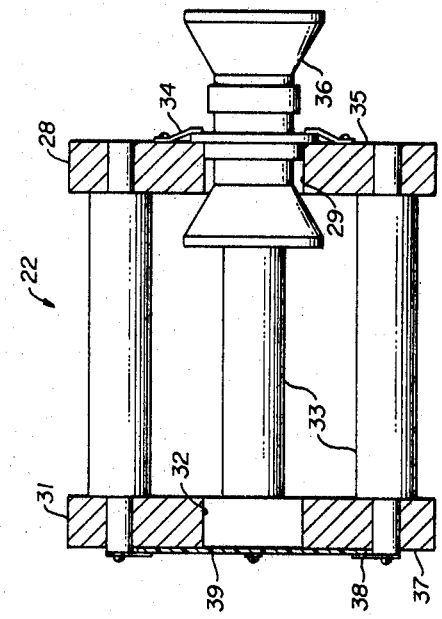
INVENTOR.
DUANE U. NORGREN
BY
ATTORNEY.

3,480,366
METHOD AND APPARATUS FOR DETERMINING IMAGE ASYMMETRY IN OPTICAL LENSES
Duane U. Norgren, Orinda, Calif., assignor to the United States of America as represented by the United States Atomic Energy Commission
Filed Sept. 16, 1966, Ser. No. 580,569
Int. Cl. G01b 11/30
U.S. Cl. 356—124     3 Claims

ABSTRACT OF THE DISCLOSURE

A precision technique and apparatus for determining the azimuthal image distortion of an optical lens. The lens is mounted in a special camera which is accurately successively positioned at predetermined rotational intervals about the optical axis of the system to multiply-expose a film to a fixed rectilinear test pattern through different sectors of the lens. Distortion is then measured from separations of the super-imposed test pattern on the developed film.

---

The present invention relates generally to optics and more particularly to a highly accurate apparatus and technique for obtaining a photographic record of image distortion in an optical lens. The invention described herein was made in the course of, or under, contract W-7405-eng-48 with the Atomic Energy Commission.

The type of distortion referred to with regard to the present invention is an image aberration produced by an asymmetrical lens as caused by a defect of the lens manufacture wherein the centers of curvature of spherical lens surfaces do not lie on a common line. Such defect causes different degrees of radial distortion in different azimuthal portions of an image obtained with the lens. For most purposes this asymmetry is non-critical. In certain situations, however, where scientific data is "mapped" by photographic recording, image asymmetry can be critically deleterious. For instance, the trails of charged atomic particles directed through a bubble chamber are generally photographed stereoscopically and data is taken from the lengths and curvatures of the particle tracks recorded on the film. It can be seen that even a slight eccentricity in the photographic objective lenses of a large bubble chamber having a wide field of view will produce inaccuracies in the recorded particle paths. Ideally, for this and similar purposes it is desirable to use a lens which displays little or no change in distortion for any given object angle as the lens is rotated about its optical axis, through 360° of azimuth. For example, if a photograph is taken of a graduated line in a test pattern lying normal to the axis of the lens, the distances measured between the graduations recorded in the photograph should be proportionally equal to the actual spacings on the line. Furthermore, if further photographs are taken, for example, with the lens rotated at 90° increments about the lens axis, the distances between the photographed graduations should not change. Such a perfect lens is very difficult to obtain, so a more practical approach in many instances is to carefully measure any image distortion and to compensate therefor in data taken from subsequent photographs made with the lens. However, while the subject invention was specifically developed to accurately measure the image distortion produced in completed camera lenses to provide such correction data, the method and apparatus can also be used as a quality control test during manufacture and assembly of lenses so that appropriate corrections can be made directly to the lenses or to the mountings thereof.

The conventional technique heretofore used in image distortion analysis involved a step-by-step procedure of individual direct measurements over the field of the lens, providing a data listing of the information. By contrast, the subject invention provides a direct graphic representation in the form of a photographed "map" of the image asymmetry. As well as providing for a distortion test which is more convenient and less time-consuming than previous tests, the invention provides increased accuracy of distortion measurement over conventional test methods.

Accordingly, it is an object of the invention to provide a means for measuring the image distortion of an optical lens over the entire azimuthal field.

It is another object of the invention to provide a graphic representation of the asymmetry present in an optical lens.

It is a further object of this invention to provide a direct method of azimuthal lens distortion analysis.

It is another object of the invention to improve the accuracy of photographed data.

It is another object of the present invention to provide an accurate means for locating the optcial center of a lens.

These and other objects of the invention together with additional advantages thereof will become apparent by reference to the following specification taken in conjunction with the accompanying drawing, of which:

FIGURE 1 is a general view of the tesing apparatus of the invention, and

FIGURE 2 is an enlarged section view of a test comera as shown in FIGURE 1.

Referring now to the drawing there is shown a collimating telescope 11 mounted on a movable optical stand 12. The telescope 11 is positioned to view a large stationary test pattern 13 spaced a substantial distance away therefrom. The axis of the telescope 11 is adjusted to be exactly normal to the surface of the test pattern 13 by auto-collimation from mirror 15 which is temporarily placed thereon and adjusted to be parallel to the surface thereof.

One example of a test pattern 13 which could be used comprises a line of accurately spaced illuminated cross-hairs 14. The cross-hairs 14 are made by depositing an aluminum film on a small disc 16 of a clear acrylic resin such as Lucite on which an 0.008 inch diameter wire cross-hair has been placed. With the wire removed, an aluminum-free cross-hair 14 remains to transmit light from behind. The discs 16 are installed in an accurately flat rectangular aluminum plate 17 with the cross-hairs 14 flush with the front surface of the plate. The discs 16 are individually illuminated from behind by a plurality of small light sources 18 each disposed in a hole 19 in the mounting plate 17 behind each cross-hair 14. A thermometer 21 is mounted on the plate 17 so that thermal expansion due to heat generated by the plurality of lamps 18 will be known and any increased spacing of the cross-hairs 14 can be determined.

A camera stand 24 is disposed between the telescope 11 and test pattern 13. The camera stand 24 has a table top 27 upon which is affixed two parallel rails 26 spaced apart to support a cylindrical camera 22. An enlarged section view of the camera 22 is shown in FIGURE 2. Referring now to both FIGURES 1 and 2 there is indicated a front annulus 28 having a central aperture 29 and rear annulus 31 having a central aperture 32. The annuli 28 and 31 are rigidly spaced apart by rods 33. The outward facing surface 35 of the front annulus 28 has clamps 34 for securing a lens assembly 36 thereagainst for testing. The outward facing surface 37 of the rear annulus 31 has clamps 38 for interchangeably securing either a microflat film plate 39 thereto, as shown in FIGURE 2, or a plane mirror 40, as shown in FIGURE 1. Since the camera will benerally be used only in a dark room, no light shield is necessary around the space between the lens 36 and film 39. To obtain accurate results form the invention, it is vital that the annuli 28 and 31 be accurately positioned with respect to an axis 41 and that the surfaces 35 and 37 be precisely normal to axis 41. Also, it is essential that the provision for mounting the lens 36 in the camera 22 be such that the axis of the lens will coincide with camera axis 41. Such precision is readily obtainable, for example, by the expediency of performing all the machining of the above-described surfaces with the camera 22 in a single tool fixture chuck.

The table top 27 of camera stand 24 is directionally adjustable both vertically and horizontally by adjustment screws 42 and 43, respectively. The base of the camera stand 24 is made very heavy for stability and is provided with leveling bolts 44 at the foot thereof. The camera position is thereby adjustable to place the film 39 normal to the axis of the telescope 11 and thus parallel to the test pattern 13.

An example of a procedure which may be followed in a lens test is as follows:

1. The camera 22 and telescope 11 are positioned to desired distances and approximate orientation with respect to pattern 13. The distance from the lens 36 to test pattern 13 must be adjusted to obtain a sharp image on the photographic plate as determined by the camera dimensions. If necessary, critical focussing may be accomplished by examination of the aerial image of the test pattern, using a microscope focussed in the plane of the photographic plate.

2. Remove camera 22 from stand. Align (auto-collimate) telescope 11 line of sight normal to mirror 15, hence to target 13. The line of sight may intersect test pattern 13 at any arbitrary point but preferably near a suitable cross-hair 14.

3. Replace camera 22 on stand. Place mirror 40 on camera 22 facing telescope 11 and align (auto-collimate) camera to line of sight of the telescope 11 by means of different adjustable screws 42 and 43.

4. Install lens 36 and micro-flat photographic plate 39. Expose film to pattern 13. Rotate camera 22 about the optical axis of the system. Again expose film to pattern 13. Repeat until desired number of azimuthal exposures have been made. (Room must be darkened). For usable results at least three multiple exposures should be made on the film plate 39 at recorded azimuthal positions of the lens 36, the number depending partly on the arrangement of the test pattern. In the present case, for the type of test pattern indicated in the drawing a total of four exposures are preferably made on the film 39 at 90° rotational intervals. The angular position of lens 39 with respect to an angular reference point on the lens is recorded. A reference mark should also be provided on the filmplate 39 so that the angular position thereof with respect to the lens 36 may be determined later. The film plate 39 is then moved from the camera 22 and the film emulsion developed.

The recorded images on the developed film 39 are then inspected and the coordinates measured and recorded. The displacement of the images of the cross-hairs 14 are then measured. A change in the measured separations at the different azimuthal stations is indicative of a change in the radial distortion of the lens. The image principal point, from which all radial measurements must be referenced, is coincident with the center of rotation as determined by the multiple images of the centralmost cross-hair 14.

It can be seen that the developed film 39 provides an accurate "map" of the distortion the lens 36 delivers to the film. In the case where the lens is to be used to film graphic scientific data for measurement, such as in a bubble chamber, the "map" of the azimuthal distortion can be used in a comprehensive measuring program to coordinate the lens distortion with the measurement of the charged particle trails recorded on film by that particular lens. Thus, once the distortions of a lens are known, corrections can thereafter be applied to positional data obtained with such lens. However, in some situations the absolute distortion may not be important and only the relative distortion need be measured.

While the invention has been described with respect to a particular embodiment thereof, it will be apparent to those skilled in the art that numerous modifications are possible within the spirit and scope of the invention. For instance, the test pattern could be a line of point light sources and the camera could be rotated 360° while a time exposure is made. The means by which the positions of the camera with respect to a test pattern is accomplished does not necessarily require the use of a telescope although such method is considered to be more accurate than any other alignment method. Therefore, it is not intended to limit the invention except as defined by the following claims.

What is claimed is:

1. A method of determining the azimuthal image distortion of an optical lens comprising the steps of: inserting said lens in a rotatable camera housing, disposing a film plate in said camera housing at the image focal distance of said lens in a plane normal to the axis of said lens, disposing a rectilinear test pattern in fixed position at the object focal distance of said lens in a plane normal to the axis of said lens, disposing a rectilinear test pattern in fixed position at the object focal distance of said lens in a plane parallel to said film plate and in the field of view of said lens, rotating said camera housing about the axis of said lens to expose said film plate to said test pattern at least three separate angular positions of rotation about the axis of said lens, developing said film, and measuring the separations between portions of the image of said pattern on said film.

2. The method of claim 1 wherein said step of disposing a test pattern in a plane parallel to the film comprises the further steps of providing a first mirror at said test pattern parallel to the surface thereof, autocollimating a telescope normal to said first mirror, disposing a mirror at the position of said film plate in said camera housing, and auto-collimating said second mirror with respect to said telescope at a position between said telescope and said test pattern.

3. The method of claim 1 wherein the step of measuring separations between portions of the image additionally comprises determining a principal reference point by finding the center of rotation of the image of a centermost fiducial mark of said pattern.

References Cited

UNITED STATES PATENTS

| | | |
|---|---|---|
| 1,134,938 | 4/1915 | Bader & Howland _____ 88—56 |
| 2,902,898 | 9/1959 | Kops _____ 88—56 |
| 3,100,239 | 8/1963 | Courtney-Pratt. |

OTHER REFERENCES

Francis E. Washer, The Precise Evaluation of Lens Distortion, Photogrammetric Engineering, vol. XXIX, No. 2, March 1963, pp. 327, 328 section 2.1.

Gomer T. McNeil, Normal Angle Camera Calibrator, Photogrammetric Engineering, vol XXVIII, No. 4, pp. 633–637.

RONALD L. WIBERT, Primary Examiner

J. ROTHENBERG, Assistant Examiner

U.S. Cl. X.R.

95—38